(12) United States Patent
Chupick (10) Patent No.: US 6,241,228 B1
(45) Date of Patent: Jun. 5, 2001

(54) FREE-FLOATING HYDRAULIC CLAMPING DEVICE USING EXPANDABLE ARBOR

(76) Inventor: Charles Chupick, 4934 Rivers Edge, Troy, MI (US) 48098

( * ) Notice: Subject to any disclaimer, the term of this patent is extended or adjusted under 35 U.S.C. 154(b) by 0 days.

(21) Appl. No.: 09/426,597

(22) Filed: Oct. 26, 1999

(51) Int. Cl.$^7$ ..................................................... B23Q 3/14
(52) U.S. Cl. ............................ 269/48.1; 269/311; 29/252
(58) Field of Search .................... 269/48.1, 309, 269/311, 71; 29/263, 252

(56) References Cited

U.S. PATENT DOCUMENTS

| | | |
|---|---|---|
| 1,427,155 | 8/1922 | Haven . |
| 2,354,480 | 7/1944 | Rossmann . |
| 2,399,831 | 5/1946 | Schmidt . |
| 2,424,309 | 7/1947 | Elvy . |
| 3,017,192 | 1/1962 | Illowsek . |
| 3,096,679 * | 7/1963 | Jones ................................. 269/48.1 |
| 3,139,785 | 7/1964 | Harwood . |
| 3,289,525 | 12/1966 | Lee . |
| 3,537,701 * | 11/1970 | Claycomb ........................... 269/309 |
| 3,565,416 | 2/1971 | Williamson et al. . |
| 3,568,562 | 3/1971 | Harwood . |
| 3,587,371 | 6/1971 | Sherwood . |
| 3,638,934 * | 2/1972 | Blum et al. ......................... 269/311 |
| 3,714,770 | 2/1973 | Rothe . |
| 3,735,994 * | 5/1973 | Jaehn .................................. 279/1 G |
| 3,747,445 * | 7/1973 | Piotrowski et al. ..................... 82/44 |
| 3,776,562 | 12/1973 | Gross et al. . |
| 3,797,173 * | 3/1974 | Pettee et al. ............................. 51/3 |
| 3,947,950 * | 4/1976 | Adams .................................. 29/523 |
| 4,198,066 * | 4/1980 | Deprez et al. ....................... 279/2 R |
| 4,393,674 | 7/1983 | Rasmussen . |
| 4,706,972 * | 11/1987 | Kormos ............................... 279/2 R |
| 5,131,637 | 7/1992 | Vaught . |
| 5,282,888 | 2/1994 | Fakawa et al. . |
| 5,370,378 * | 12/1994 | Weber et al. ......................... 269/309 |
| 5,595,376 | 1/1997 | Hua . |
| 5,630,577 | 5/1997 | Tankersley . |
| 5,732,937 | 3/1998 | Morghen . |

FOREIGN PATENT DOCUMENTS

| | | |
|---|---|---|
| 7978 * | of 1885 | (GB) .................................. 29/263 |
| 1678549 A1 | 9/1991 | (SU) . |

* cited by examiner

Primary Examiner—Stephen F. Gerrity
Assistant Examiner—Hadi Shakeri
(74) Attorney, Agent, or Firm—Harness, Dickey & Pierce, PLC

(57) ABSTRACT

The present invention provides a workholder for securing a work piece by engaging at least one bore contained in the work piece. The workholder includes a support platform, bore clamping device, and a locator assembly. The bore clamping device is mounted to the support platform and has a cylindrical, expandable arbor extending upwardly from the support platform for positioning in and engaging the bore.

19 Claims, 8 Drawing Sheets

FREE-FLOATING HYDRAULIC CLAMPING DEVICE USING EXPANDABLE ARBOR

FIELD OF THE INVENTION

The present invention relates to a workholder for securing a work piece and, more particularly, to a workholder for securing a work piece which engages internal diameters of bores in the work piece with an expandable arbor.

BACKGROUND OF THE INVENTION

In conventional manufacturing, work pieces typically are secured to a surface or fixture to allow cutting elements, such as mills, to accurately remove material from the work piece and shape the work piece into a final product. Various support platforms, such as work benches, are suitable to serve as the support platform. The support platform serves to provide a solid base against which the cutting element may apply pressure to the work piece and also provides a foundation for dimensional consistency. To secure the work piece to the support platform, clamping devices are employed which extend from the support platform, around a side of the work piece and apply pressure to an upper surface of the work piece opposite the support platform. As a result, the clamp presses the work piece against the support platform to allow the cutting elements to proceed in machining areas of the work piece which are not obstructed by the clamping element.

While this clamping method effectively secures the work piece to the support platform, the positioning of the clamps many times obstructs the cutting elements access to the work piece and thereby renders machining difficult. As a result, the work piece must be continuously unclamped and reclamped in different areas to allow access to the previously obstructed areas. This causes increased manufacturing cost and time. The present invention was developed in light of these drawbacks.

SUMMARY OF THE INVENTION

It is, therefore, an object of the present invention to provide a workholder which utilizes an expandable arbor to engage bores contained within the work piece, thereby maximizing the amount of access the cutting element has to the work piece.

It is yet another object of the present invention to provide a workholder which utilizes an expandable arbor to engage bores contained within the work piece, which first clamps the bores and then draws the work piece against a support platform.

It is still another object of the present invention to provide a workholder which utilizes an expandable arbor to engage bores contained within the work piece, wherein the amount of expansion force generated by the expandable arbor on the bores is variable.

It is still another object of the present invention to provide a workholder which utilizes an expandable arbor to engage bores contained within the work piece, which allows adjustment for varying hole positioning on the work piece.

To accomplish these and other objects, the present invention provides a workholder for securing a work piece by engaging at least one bore contained in the work piece and locating on a second bore of the work piece. The workholder includes a support platform, bore clamping device, and a locator assembly. The bore clamping device is mounted to the support platform and has a cylindrical, expandable arbor extending upwardly from the support platform for positioning in and engaging the bore. The locator assembly has a locator pin extending upwardly from the support platform for positioning within and locating the second bore.

In another aspect of the present inventor, a workholder for securing a work piece by engaging a plurality of bores contained in the work piece which includes a support platform and a plurality of bore clamping devices mounted to the support platform. Each bore clamping device has a cylindrical, expandable arbor extending upward from the support platform for engaging one of the bores.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
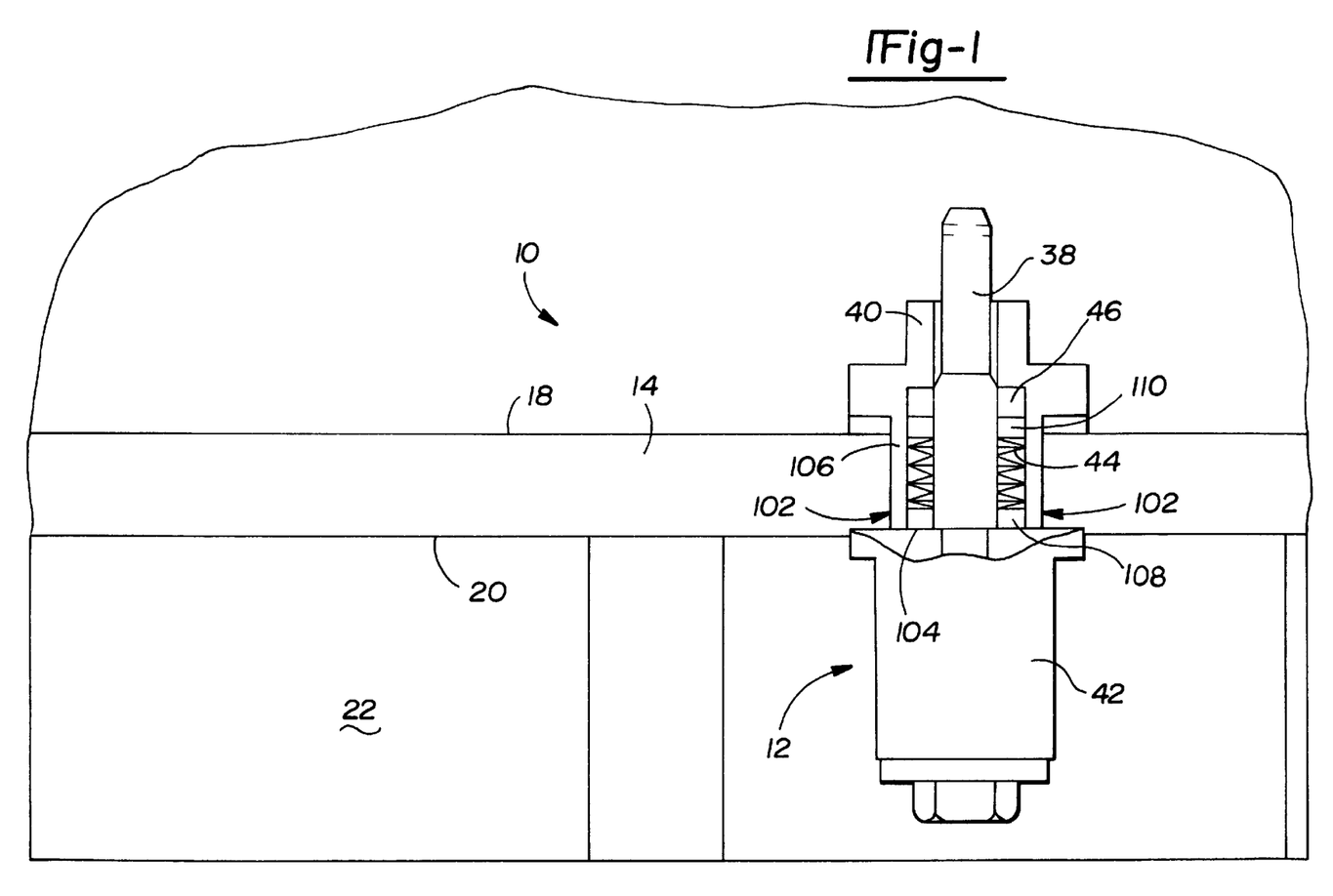
FIG. 1 is a cross-sectional view of a workholder according to the present invention.

Referring now to FIG. 1, a first embodiment of a workholder 10 is shown and described. Workholder 10 generally comprises clamping device 12 mounted to support platform 14. Support platform 14 has an upper surface 18 and a lower surface 20 which is adjacent to a lower cavity 22. Upper surface 18 is preferably machined to specific tolerances (for reasons which will be discussed). Clamping device 12 generally includes a cylindrical expandable arbor 38, elevated support 40, hydraulic cylinder 42, spring element 44, and wedge 46.

Figures 2, 3, 4A, 4B:
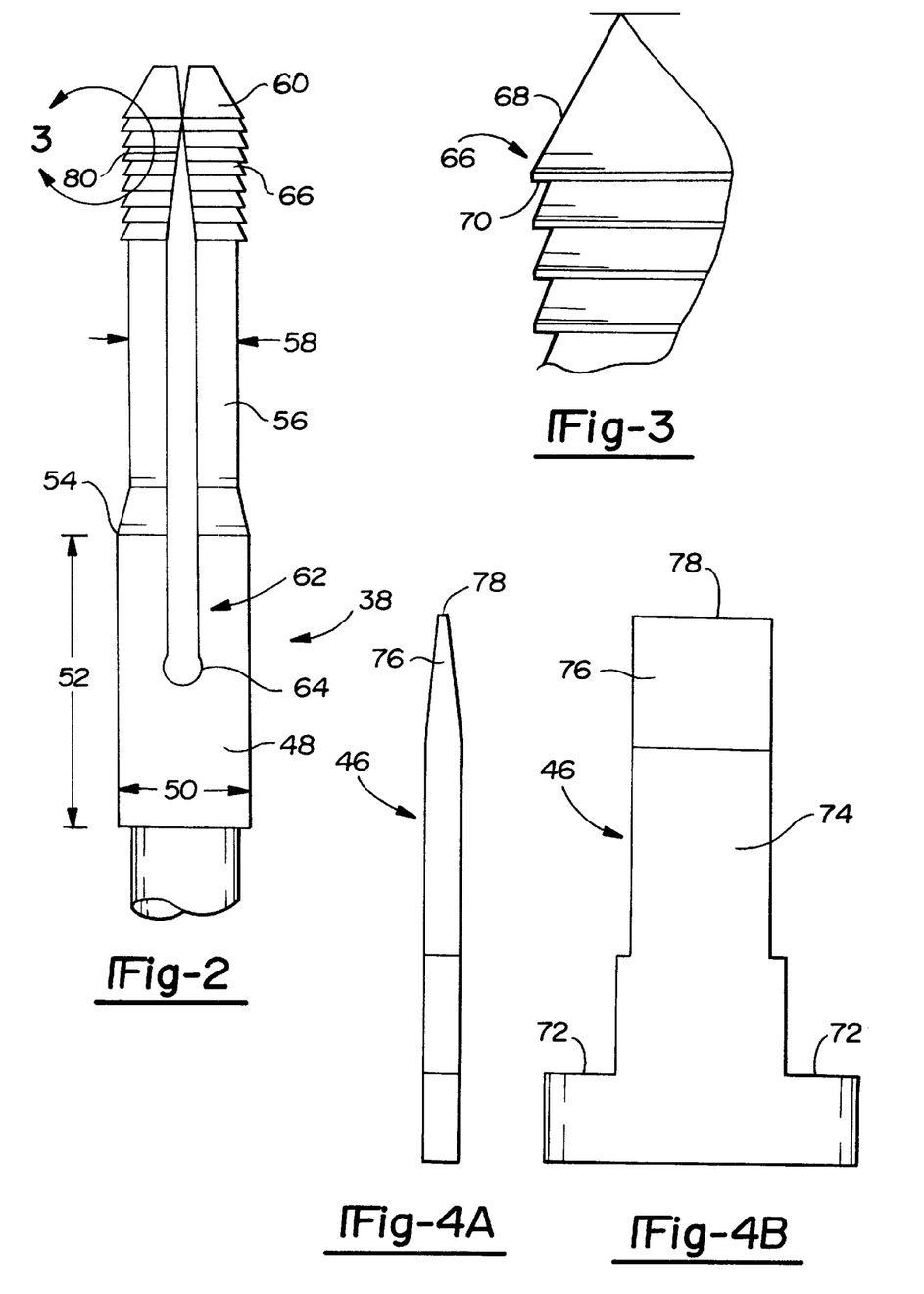
FIG. 2 is a schematic view of a cylindrical expandable arbor of a workholder according to the present invention.
FIG. 3 is a schematic view of serrated edges of a workholder according to the present invention.
FIG. 4A is a schematic view of a wedge of a workholder according to the present invention.
FIG. 4B is a schematic view of a wedge of a workholder according to the present invention.

Referring now to FIG. 2, cylindrical expandable arbor 38 of clamping device 12 is described in greater detail. Cylindrical expandable arbor 38 has a first portion 48 having an outer diameter 50 extending a predetermined length 52 along first portion 48. At a transition point 54, first portion 48 chamfers inwardly to second portion 56. Second portion 56 has a second diameter 58 which extends upwardly along second portion 56 until reaching tip 60. Slit 62 extends upwardly along cylindrical expandable arbor 38 from a first end 64 and terminates at a point distally located from first portion 48, preferably tip 60. Around the upper area of second portion 56 is located a series of serrated edges 66. As shown in FIG. 3, serrated edges 66 generally have sloped upper area 68 and jagged downward surfaces 70. By this way, serrated edges 66 are able to draw traction force in a downward direction with respect to cylindrical expandable arbor 38.

Referring now to FIG. 4A and FIG. 4B, wedge 46 is described in greater detail. As is shown, wedge 46 has a pair of wings 72 which extend outwardly from a central body 74. At the upper portion of central body 74, central body 74 chamfers at area 76 toward a point 78.

Figure 5:
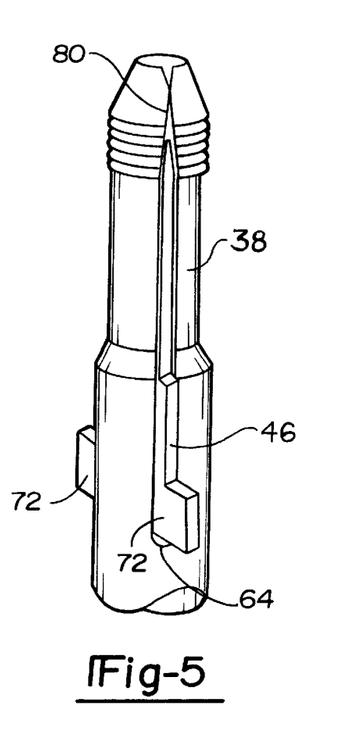
FIG. 5 is a perspective view of a cylindrical expandable arbor of a workholder according to the present invention.

Referring now to FIG. 5, cylindrical expandable arbor 38 is shown assembled with wedge 46. As shown, wings 72 are positioned proximate end 64 and extend outwardly from both sides of cylindrical expandable arbor 38. Central body 74 of wedge 46 extends upwardly inside slit 62 until being proximate narrowed region 80.

Figure 6:
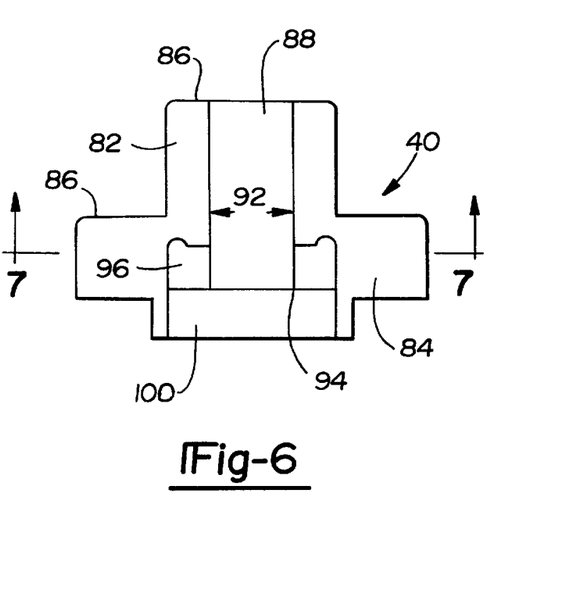
FIG. 6 is a cross-sectional view of an elevated support of a workholder according to the present invention.
Figure 7:
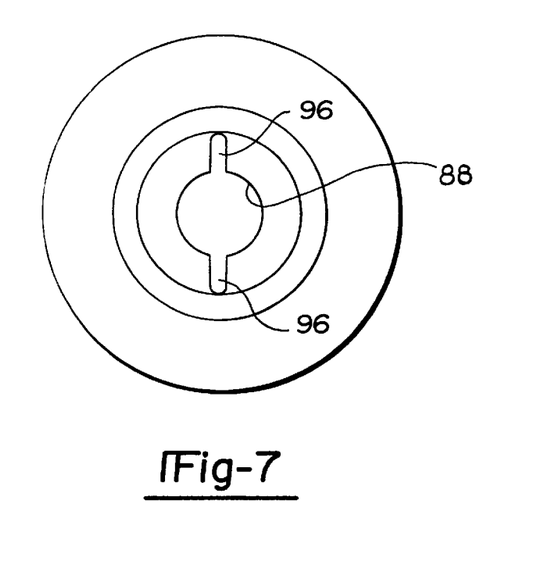
FIG. 7 is a sectional view of an elevated support of a workholder along lines 7—7 in FIG. 6 according to the present invention.

Referring now to FIG. 6, elevated support 40 is described in greater detail. Elevated support 40 has a upper cylindrical region 82 and an outer rim 84. Both upper cylindrical region 82 and outer rim 84 have a pair of locating surfaces 86. Passage 88 extends through elevated support 40 downward to a predetermined depth 94. Inner diameter 92 is substantially equal to outer diameter 50 of cylindrical expandable arbor 38 to provide lateral support of cylindrical expandable arbor 38. Elevated support 40 further has a pair of square slots 96 which are dimensioned to accommodate wings 72. A lower part of elevated support 40 is a counterbore 100. Counterbore 100 has a diameter substantially larger than diameter 92. In FIG. 7, a sectional view of section 7—7 in FIG. 6 is shown. Here, square slots 96 can clearly be seen. Moreover, the extension of passage 88 to predetermined depth 94 is also readily understood.

Referring again to FIG. 1, the assembly of clamping device 12 will now be discussed. Cylindrical expandable arbor 38 passes through passage 88 and is operationally engaged to hydraulic cylinder 42. In its unclamped state, a part of first portion 48 of cylindrical expandable arbor 38 is flush against a portion of inner diameter 92 of elevated support 40. Counterbore 100, outer diameter 102 of support platform 14 and upper face 104 form the bounds of a cavity 106. Within cavity 106 and positioned on spacer 108 is spring element 44. Preferably, spring element 44 is a plurality of stacked belleville washers. Positioned on spring element 44 is spacer 110. Spacer 108 and spacer 110 are dimensioned such that the bottoms of wings 72 are flush against the upper area of spacer 110.

Figures 8A, 8B:
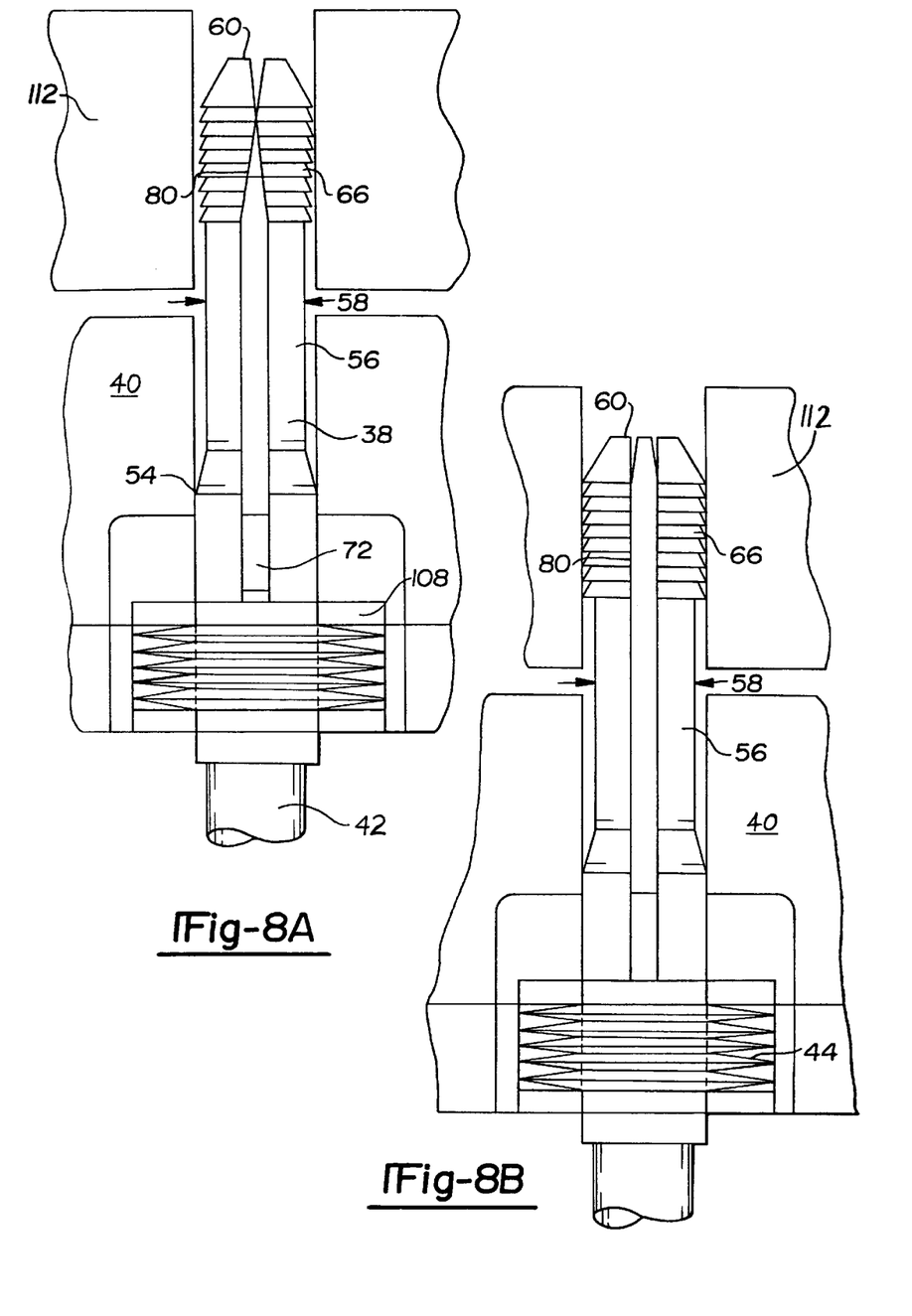
FIG. 8A is an operational view of a workholder according to the present invention.
FIG. 8B is an operational view of a workholder according to the present invention.
Figures 8C, 9:
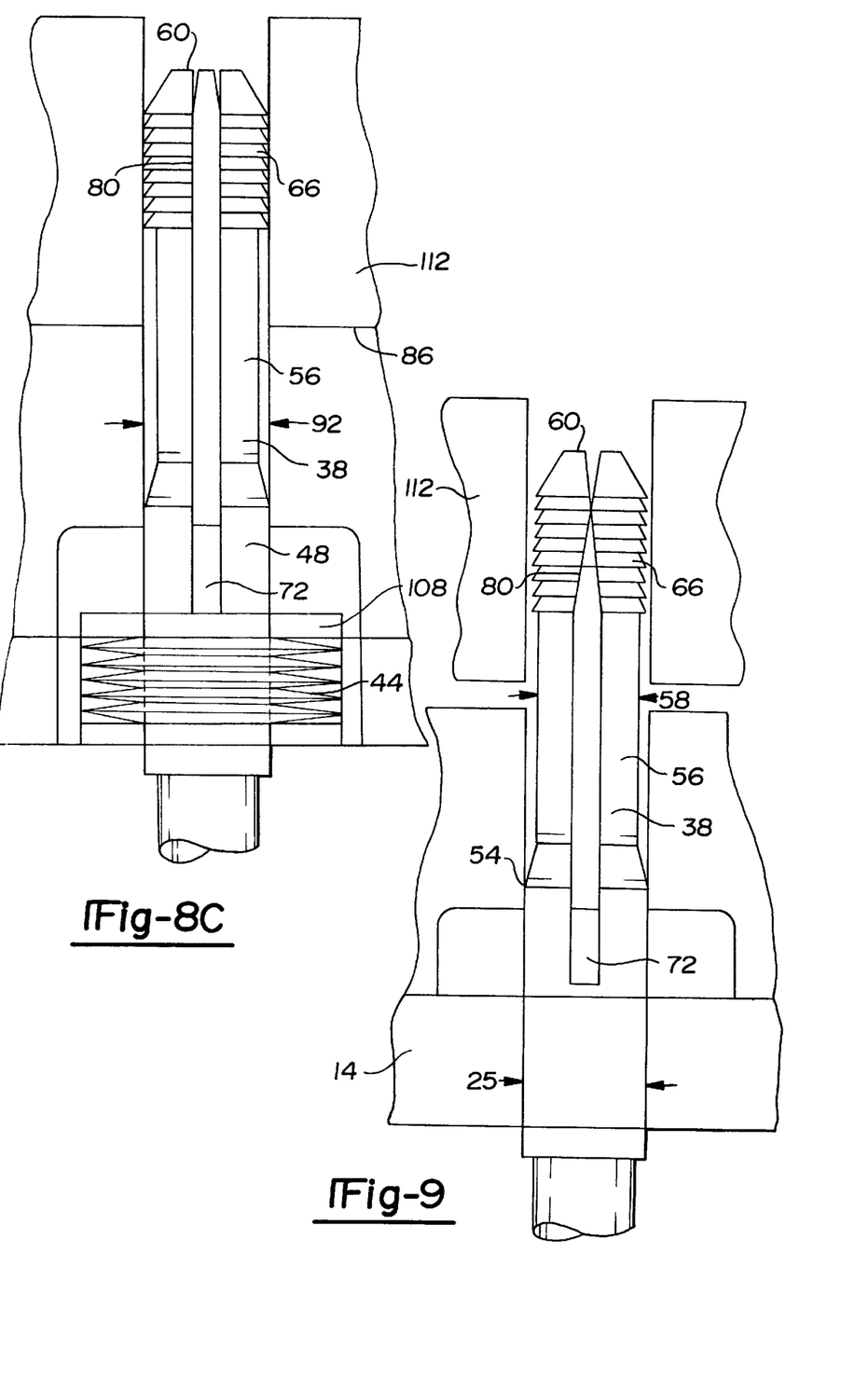
FIG. 8C is an operational view of a workholder according to the present invention.
FIG. 9 is an operational view of a second embodiment of a workholder according to the present invention.

Referring now to FIGS. 8A, 8B, and 8C, the operation of the present invention will be described. In FIG. 8A, work piece 112 is shown positioned around second portion 56 of cylindrical expandable arbor 38. In operation, hydraulic cylinder 42 draws cylindrical expandable arbor 38 downward, thereby causing wing 72 to contact spacer 108. As shown in FIG. 8B, this contact begins compressing spring element 44 which exerts a force opposite to that of hydraulic cylinder 42, thereby causing wedge 46 to move upward toward tip 60 and expand second portion 56. This expansion drives serrated edges 66 into work piece 112. This expansion results in clamping of work piece 112.

It is noted that in the clamped position, first portion 48 and transition point 54 are no longer adjacent to inner diameter 92 of passage 88. Instead, the smaller diameter in the second portion 56 is proximate inner diameter 92. Because of this smaller diameter, cylindrical region 82 is no longer providing support to cylindrical expandable arbor 38. This allows cylindrical expandable arbor 38 to flex and accommodate for any variations in the location of bores in the work piece 112.

Referring now to FIG. 8C, continued retraction of cylindrical expandable arbor 38 by hydraulic cylinder 42 draws work piece 112 against locating surface 86 of elevated support 40. It is noted that the spring constant of spring element 44 changes the amount of clamping pressure exerted on the walls of work piece 112 before work piece 112 is brought against locating surface 86. As such, if one desires a large amount of clamping force on the walls of work piece 112, one would use a spring element 44 with a large spring constant. A large amount of force required to compress spring element 44 would cause a large expansion force of cylindrical expandable arbor 38 before the force would equalize and spring element 44 would be compressed. This large spring force could be any force which ensures that the bore is clamped before it is drawn against locating surface 86. If sufficient clamping force is not obtained before the work piece is drawn against locating surface 86, then the insufficient force could cause cylindrical expandable arbor 38 to broach the bore. If too much force is applied, then the internal bore could be permanently marked. The proper forces can be obtained without undue experimentation and depends on the material which the work piece is constructed from.

Referring now to FIG. 9, a second embodiment of the present invention is shown and described. Here, spacer 108 and 110 and spring element 44 are replaced by a smaller diameter bore 25 in support platform 14. When hydraulic cylinder 42 draws cylindrical expandable arbor 38 downward, wing 72 intersect support platform 14 instead of spacer 108 of the first embodiment. As such, the support platform 14, itself, provides the required opposite force on wing 72 for clamping action. Although this embodiment does not provide the clamping force distribution as the springs in the first embodiment, it does result in reduced construction costs.

Figure 10:
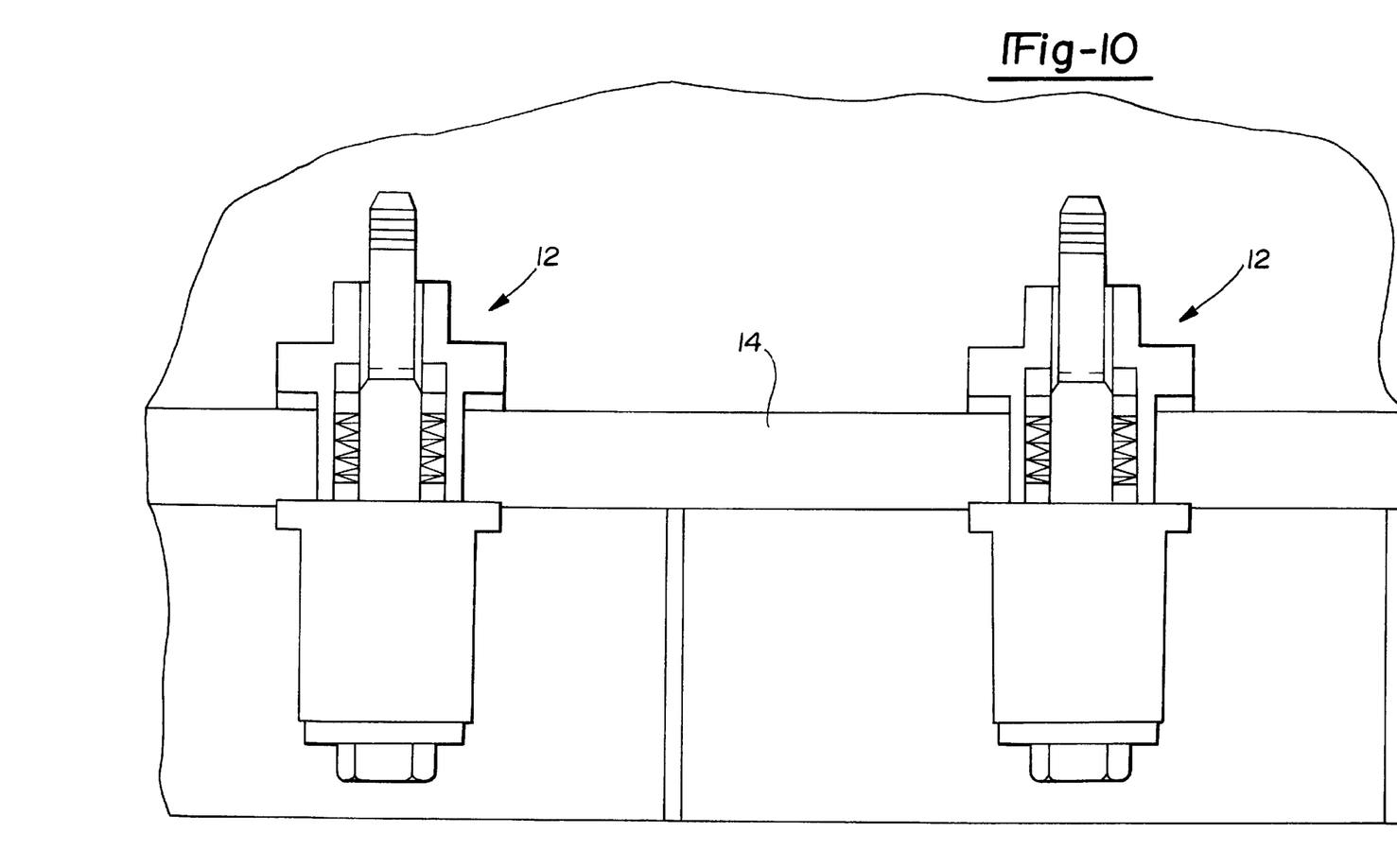
FIG. 10 is a cross-sectional view of a workholder according to a third embodiment of the present invention.

Referring now to FIG. 10, a third embodiment of the present invention is shown and described. Here, two separate clamping devices 12 are mounted to support platform 14. Each clamping device 12 operates as disclosed in the first embodiment above. Each clamping device is positioned to clamp a different bore on one work piece. Because of the absence of support on cylindrical expandable arbor 38 by cylindrical region 82, as discussed in the first embodiment, each cylindrical expandable arbor 38 is able to laterally flex. As a result, a work piece having inaccurate, rough, bores can be clamped without the requirement that each bore be an accurate distance away from the respective bore.

Figure 11:
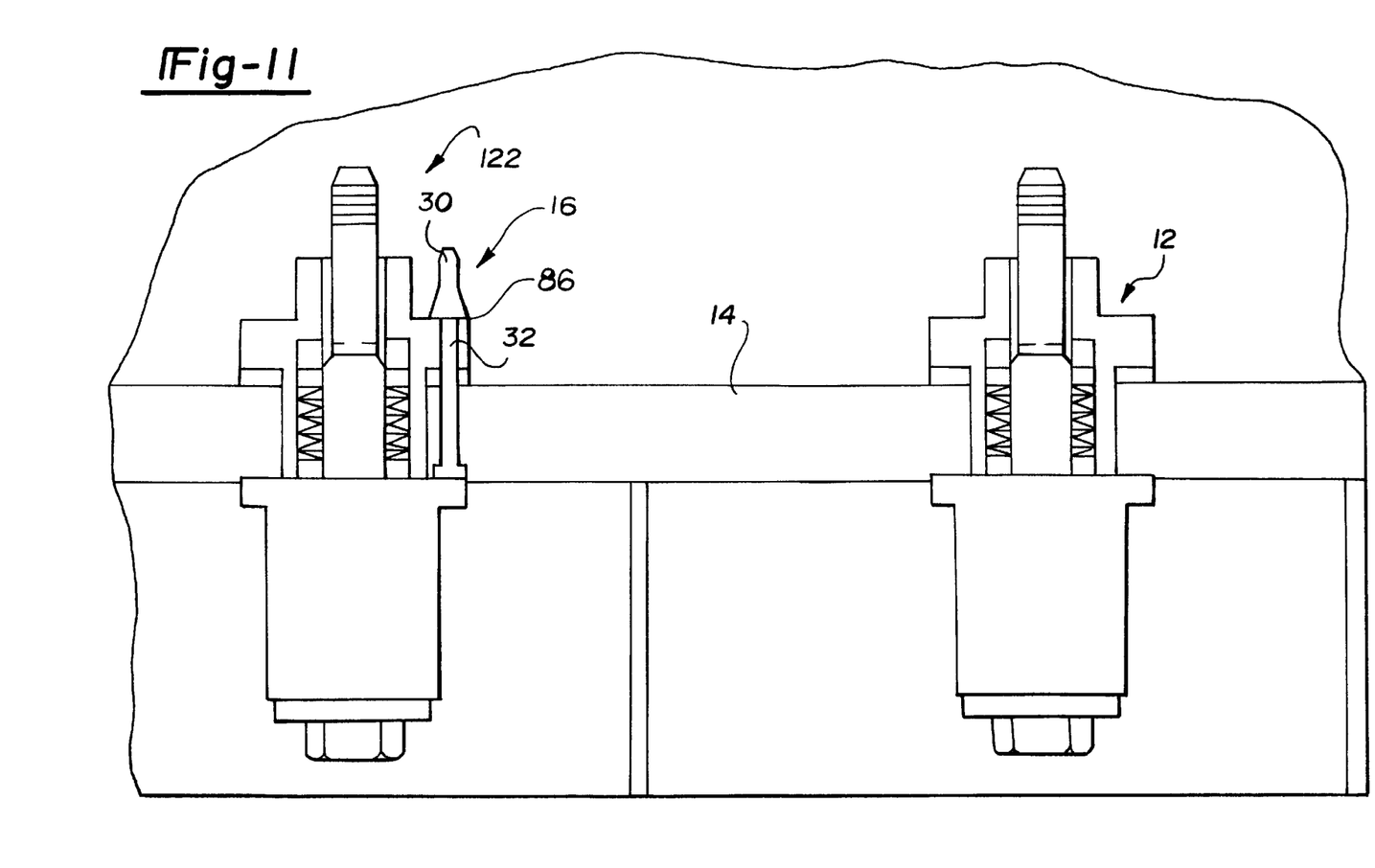
FIG. 11 is a plan view of a work holder according to a fourth embodiment of the present invention.

In FIG. 11, a fourth embodiment is shown having two clamping devices 12 and 122. A locator assembly 16 is mounted to locating surface 86 of clamping device 122. Locator assembly 16 is attached to locating surface 86 and support platform 14 by bolt 32. Here, locator assembly 16 acts to slide into a bore and accurately position a work piece which is being machined. Thus, in operation, bores contained in a work piece are slid over a respective cylindrical expandable arbor 38 of clamping device 12 and 122 as well as locator assembly 16. The locator assembly 16 serves to accurately position the work piece while the clamping devices 12 and 122 serve to secure the work piece.

Figure 12:
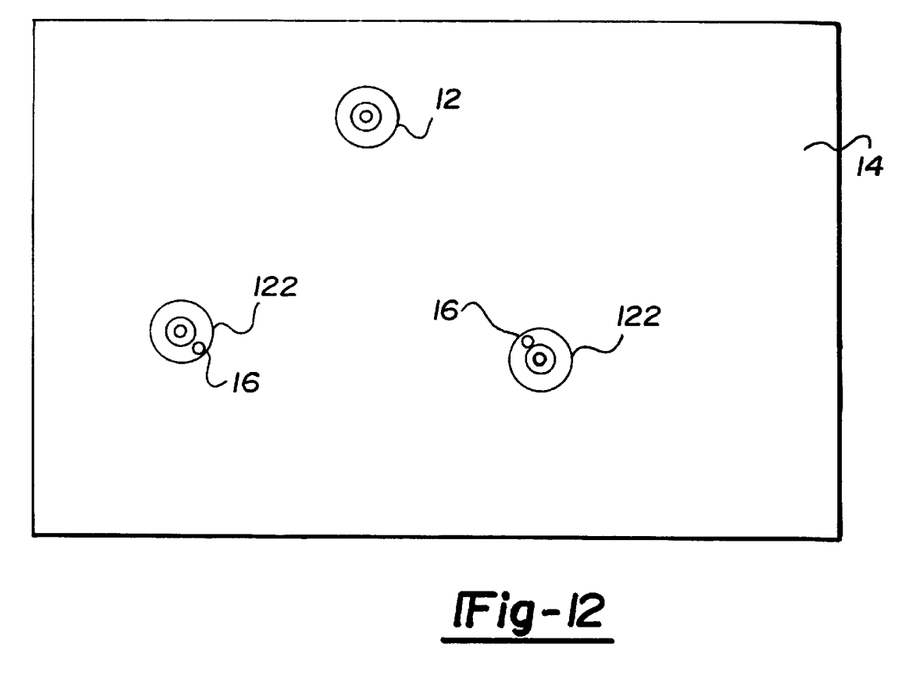
FIG. 12 is a plan view of a work holder according to a fifth embodiment of the present invention.

In FIG. 12, a fifth embodiment of the present invention is shown having a clamping device 12 and clamping devices 122 (which have locator assemblies 16. Unlike the locator in the fourth embodiment, the plurality of locators 16 in the fifth embodiment restrain the work piece from moving in both translational (x and y) as well as rotational about any one locator assembly 16. Also, clamping devices 122 and 12 are shown positioned in a non-linear relationship and, preferably, in a triangular configuration. As such, a maximum amount of stability from rotational and lateral movement is provided to a work piece.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A workholder for securing a work piece by engaging a plurality of bores contained in said work piece, said workholder comprising:
    a support platform including:
        a plurality of cavities extending downwardly into said support platform;
        a plurality of spring elements, each of said spring elements positioned in a respective cavity;
        a plurality of bore clamping devices mounted to said support platform, each of said bore clamping devices having a cylindrical expandable arbor extending upward from said support platform for engaging one of said bores, each said cylindrical expandable arbor extending through a respective cavity, said cylindrical expandable arbor including:
            a slit vertically extending through said cylindrical expandable arbor from a first end proximate said support platform to a second end distally located from said support platform, said slit having a narrow region proximate said second end, each said cylindrical expandable arbor extending through a respective cavity;
            a wedge positioned within said slit, said wedge having a pair of wings extending from opposing sides of said wedge and said slit, said wings extending outwardly from said cylindrical expandable arbor and over a respective spring element; and
            a hydraulic cylinder in operational engagement with said first end of said cylindrical expandable arbor, whereby said hydraulic cylinder is selectively actuated to draw said cylindrical expandable arbor toward said support platform to thereby drive said wedge towards said second end of said slit to expand said cylindrical expandable arbor.

2. A workholder for securing a work piece by engaging at least one bore contained in said work piece and locating on a second bore of said work piece, said workholder comprising:
    a support platform;
    a bore clamping device mounted to said support platform, said bore clamping device having a cylindrical expandable arbor extending upward from said support platform for positioning in and engaging a bore of the work piece, the arbor having a first end and a second end, the first end having a plurality of outwardly extending serrations that are operable to engage a bore in the work piece, the arbor further having a longitudinally extending slot that extends from the second end to a tapered internal section of the first end;
    a wedge positioned within the slot, the wedge having a tapered end portion that engages the tapered section of the slot so as to cause the serrations to move outwardly and engage the bore of the work piece;
    a locator assembly integral with the bore clamping device, the locator assembly having a locator pin extending upwardly from said support platform for positioning within and locating said second bore; and
    whereby said locator pin positions said work piece for clamping by said clamping device.

3. A workholder as claimed in claim 2, wherein said cylindrical expandable arbor includes:
    a slit vertically extending through said cylindrical expandable arbor from a first end proximate said support platform to a second end distally located from said support platform, said slit having a narrow region proximate said second end; and
    wedge positioned within said slit, said wedge having a pair of wings extending from opposing sides of said wedge and said slit.

4. A workholder as claimed in claim 3, wherein said cylindrical expandable arbor has a bottom end which extends through a narrow aperture in said support platform, said wings being positioned above said narrow aperture and extending outward from said cylindrical expandable arbor greater than a diameter of said narrow aperture, whereby said cylindrical expandable arbor is expanded by drawing said cylindrical expandable arbor toward said support platform to cause interference between said wings and said support platform outside said narrow aperture to drive said wedge toward said second end of said slit.

5. A workholder as claimed in claim 4, further comprising an elevated support positioned on said support platform, said elevated support having a support bore having a diameter substantially equal to a first diameter of said cylindrical expandable arbor, said cylindrical expandable arbor passing through said support bore, whereby said elevated support guides said cylindrical expandable arbor.

6. A workholder as claimed in claim 5, wherein said first diameter extends along a first predetermined distance and then transitions to a second diameter at a transition point, said second diameter being smaller than said first diameter, said transition point being located such that said first diameter is proximate said support bore when said bore clamping device is in an unclamped state and said second diameter is proximate said support bore when said clamping device is in a clamped state, whereby said cylindrical expandable arbor is able to flex to aid in locating said work piece.

7. A workholder as claimed in claim 4, wherein said bottom end of said cylindrical expandable arbor is operationally engaged to a hydraulic cylinder, wherein said hydraulic cylinder is adapted to draw said cylindrical expandable arbor toward said support platform.

8. A workholder as claimed in claim 3, wherein said support platform has a cavity extending downwardly into said support platform and terminating at a base area, said cylindrical expandable arbor extending through said cavity, said support platform having a spring element contained in said base area, whereby said cylindrical expandable arbor is expanded by drawing said cylindrical expandable arbor toward said support platform to cause interference between said wings and said spring element to drive said wedge toward said second end of said slit.

9. A workholder as claimed in claim 8, wherein said bottom end of said cylindrical expandable arbor is operationally engaged to a hydraulic cylinder, wherein said hydraulic cylinder is adapted to draw said cylindrical expandable arbor toward said support platform.

10. A workholder as claimed in claim 8, wherein said cylindrical expandable arbor clamps by engaging said bore and drawing said work piece toward said support platform, said spring element having a spring constant sufficient to ensure said bore is engaged before said work piece is drawn against said support platform.

11. A workholder for securing a work piece by engaging a bore contained in said work piece, said workholder comprising:
- a support platform;
- a bore clamping device mounted to said support platform, said bore clamping device having a cylindrical expandable arbor for engaging said bore,
- the cylindrical expandable arbor having a first end and a second end, the first end having a plurality of outwardly extending protrusions that engage the bore in the work piece, the arbor further having a slot with a tapered internal section;
- a wedge positioned within the slot, the wedge having a tapered end portion that engages the tapered internal section of the slot; and
- a hydraulic cylinder for selectively activating the arbor and advancing the wedge to a position where the protrusions of the arbor engage the bore of the work piece and the hydraulic cylinder draws the arbor towards the support platform.

12. A workholder as claimed in claim 11, wherein said cylindrical expandable arbor includes:
- a slit vertically extending through said cylindrical expandable arbor from a first end proximate said support platform to a second end distally located from said support platform, said slit having a narrow region proximate said second end; and
- a wedge positioned within said slit, said wedge having a pair of wings extending from opposing sides of said wedge and said slit.

13. A workholder as claimed in claim 12, wherein the cylindrical expandable arbor has a bottom end which extends through a respective narrow aperture in said support platform, said wings being positioned above said narrow aperture and extending outward from said cylindrical expandable arbor greater than a diameter of said narrow aperture, whereby said cylindrical expandable arbor is expanded by drawing said cylindrical expandable arbor toward said support platform to cause interference between said wings and said support platform outside said narrow aperture to drive said wedge toward said second end of said slit.

14. A workholder as claimed in claim 13, wherein said bottom end of said cylindrical expandable arbor is operationally engaged to the hydraulic cylinder.

15. A workholder as claimed in claim 12, further comprising an elevated support positioned on said support platform, said elevated support having a support bore having a diameter substantially equal to a first diameter of said cylindrical expandable arbor, said cylindrical expandable arbor passing through said support bore, whereby said elevated support guides said cylindrical expandable arbor.

16. A workholder as claimed in claim 12, wherein said first diameter extends along a first predetermined distance and then transitions to a second diameter at a transition point, said second diameter being smaller than said first diameter, said transition point being located such that said first diameter is proximate said support bore when said bore clamping device is in an unclamped state and said second diameter is proximate said support bore when said clamping device is in a clamped state.

17. A workholder as claimed in claim 14, wherein said support platform includes:
- a plurality of cavities extending downwardly into said support platform, each said cylindrical expandable arbor extending through a respective cavity; and
- a plurality of spring elements, each of said spring elements contained in a respective cavity, whereby each said cylindrical expandable arbor is expanded by drawing said cylindrical expandable arbor toward said support platform to cause interference between said wings and said spring element to drive said wedge toward said second end of said slit.

18. A workholder as claimed in claim 17, wherein the cylindrical expandable arbor clamps by engaging a respective bore and drawing said work piece against said support platform, said spring element having a spring constant sufficient to ensure said bore is engaged before said work piece is drawn against said support structure.

19. A workholder for securing a work piece by engaging a bore contained in said work piece, said workholder comprising:
- a support platform, a cavity located in the support platform;
- at least one spring located in the cavity;
- a clamping device assembly mounted to said support platform, the clamping device assembly having an expandable arbor with an internal slot, a wedge located within the slot, and a support member operable to receive said arbor, the wedge having a pair of wings extending from opposing sides of the slot and protruding from the arbor to engage said spring; and
- an actuating device for moving the arbor.

* * * * *